US010129964B1

(12) United States Patent
Fails et al.

(10) Patent No.: US 10,129,964 B1
(45) Date of Patent: Nov. 13, 2018

(54) WIRELESS TOOL AND METHODS FOR CONTROLLING AND TESTING SYSTEMS

(71) Applicant: City Theatrical, Inc., Carlstadt, NJ (US)

(72) Inventors: Gary Fails, Tappan, NY (US); Paul Kleissler, Englewood, NJ (US); Matteo Vigni, Kearny, NJ (US)

(73) Assignee: CITY THEATRICAL, INC., Carlstadt, NJ (US)

( * ) Notice: Subject to any disclaimer, the term of this patent is extended or adjusted under 35 U.S.C. 154(b) by 0 days.

(21) Appl. No.: 15/788,160

(22) Filed: Oct. 19, 2017

Related U.S. Application Data (60) Provisional application No. 62/410,100, filed on Oct. 19, 2016.

(51) Int. Cl.
| | |
|---|---|
| *H05B 33/00* | (2006.01) |
| *H05B 37/02* | (2006.01) |
| *H04L 12/28* | (2006.01) |
| *H05B 33/08* | (2006.01) |
| *H04L 29/06* | (2006.01) |
| *H04W 4/80* | (2018.01) |

(52) U.S. Cl.
CPC ....... *H05B 37/0272* (2013.01); *H04L 12/282* (2013.01); *H04L 12/2816* (2013.01); *H04L 12/2836* (2013.01); *H05B 33/0863* (2013.01); *H05B 37/0254* (2013.01); *H04L 69/08* (2013.01); *H04W 4/80* (2018.02)

(58) Field of Classification Search
CPC ............ H05B 37/0272; H05B 37/0254; H05B 33/0845; H05B 33/0842; H05B 33/0863; H05B 33/08; H05B 37/0245; F21W 2131/103; F21W 2111/02; F21W 2131/101; F21W 2131/105; G08C 17/02; G08C 2201/40; G08C 2201/50; H04L 69/08; H04L 12/2803; H04L 2012/4026; H04Q 2209/25; H04Q 2209/43

See application file for complete search history.

(56) References Cited

U.S. PATENT DOCUMENTS 9,210,778 B2 * 12/2015 Chen ....................... H04L 69/18
9,575,091 B2 *  2/2017 Reeder, III ........... G01R 1/0408
9,800,431 B2 * 10/2017 Vollmer ............. H04L 12/2836
(Continued)

OTHER PUBLICATIONS

City Theatrical, DMXcat Quick Start Guide.*

*Primary Examiner* — Vibol Tan
(74) *Attorney, Agent, or Firm* — Myers, Wolin, LLC (57) ABSTRACT

A device, system, and method are provided for controlling a fixture, such as a lighting fixture. The device includes a fixture communication interface for transmitting data to a fixture using a first communication protocol, such as DMX, and an application communication interface for wirelessly receiving information using a second communication protocol, such as Bluetooth. The device further comprises a processor for converting the information received at the application communication interface from the second communication protocol to the first communication protocol. The first communication protocol requires more data than can be transmitted using the Bluetooth protocol, and converting the information may include adding default data or restored data to data being transmitted to the fixture.

20 Claims, 6 Drawing Sheets

(56) References Cited

U.S. PATENT DOCUMENTS

| | | | |
|---|---|---|---|
| 2011/0280251 A1* | 11/2011 | Fails | H05B 37/0254 |
| | | | 370/401 |
| 2014/0266287 A1* | 9/2014 | Reeder, III | G01R 1/0408 |
| | | | 324/759.01 |
| 2015/0256654 A1* | 9/2015 | Oguchi | H04L 69/08 |
| | | | 709/230 |
| 2016/0100039 A1* | 4/2016 | Shon | H04L 12/2803 |
| | | | 370/467 |
| 2016/0205746 A1* | 7/2016 | Kumar | H05B 37/0227 |
| | | | 315/297 |

* cited by examiner

WIRELESS TOOL AND METHODS FOR CONTROLLING AND TESTING SYSTEMS

CROSS REFERENCE TO RELATED APPLICATIONS

This application claims the benefit of provisional application U.S. 62/410,100 filed on Oct. 19, 2016, the entire contents of which is incorporated herein by reference.

FIELD OF THE INVENTION

This disclosure relates to wireless tool for controlling and testing systems, in particular, lighting systems.

BACKGROUND

Modern LED lighting fixtures that utilize DMX (Digital Multiplexing) for their control are often difficult to control without large, complicated, and expensive lighting controllers.

For example DMX for lighting is typically implemented using a "DMX 512" standard, which includes 512 DMX slots to control various aspects of a lighting installation. However, each of those 512 available slots may control different aspects of a lighting installation in difference cases. Further, in cases where only a subset of the available 512 slots are in use, it is not always obvious which of those 512 slots are in use. Accordingly, the control of these LED fixtures requires many slots of DMX control which are often not intuitive and often require the user to look up the manual just to be able to turn on and test the fixture.

Some portable devices exist that can control individual DMX slots of a lighting installation. However, existing devices typically transmit signals blindly to specific DMX slots, and therefore a user will need to look up which slot to use in order to properly use or test various features of the lighting installation. Further, devices exist that utilize smart phone applications for control purposes. However, such devices typically require a connection from the phone's audio jack which requires a wired connection to the device and prevents the phone from being used to make or receive phone calls while in use.

Existing tools for controlling lighting suffer from drawbacks such as being too large to carry with the user, not containing an internal database of fixture parameters, being unable to automatically load the fixture parameters via RDM, (thereby requiring the user to hunt or guess for the DMX slots that control, color, intensity, or other attributes). Further, existing tools require a wired connection between the lighting fixture and the controller thereby requiring the user to be in close proximity with the fixture. In such devices, wired controls are required since standard wireless protocols, such as RDM, require that data be transmitted at a higher rate than smartphone wireless protocols can manage.

Further, while existing systems may utilize smart phone applications, and may allow you to add text to slots to identify the parameter of the attribute once known, using that feature requires the fixture attributes to first be known. Further, once a label is set, a user typically cannot easily move the group of labels to a new DMX start address. Accordingly, a particular setup, such as for a show, may have dozens of distinct fixture types, and setting them all up could take several hours.

Further, some existing systems only allow 12 slots of control at a time, and some fixtures may require dozens of slots of control, thus it is impossible to control the fixture adequately. Further, some slots of control have various levels that perform various distinct functions, and without direct setting of the level it is not possible to perform the various functions. For example, a slot data value of 128 may set the fixture color for a specified fixture to magenta and a slot data value of 129 may instead set the fixture color to blue. Without direct control of the slot data value, it is difficult to control this function.

There is no portable tool that lighting users can carry with them that allows them to select and control LED lighting fixtures with DMX and RDM (Remote Device Management) with a wireless connection from the tool to the app, and which selects the fixture's personality manually or detects it automatically using RDM.

SUMMARY

A system is designed for use by lighting professionals is involved with the planning, installation, operation, or maintenance of theatrical and studio lighting equipment. The system consists of a small hardware interface device and a suite of mobile applications. Together, they combine to bring DMX/RDM control plus several other functionalities to the user's smartphone for use wherever and whenever they are needed. In the system described, the small hardware device controls lighting fixtures using traditional DMX and RDM control protocols, and a smartphone may be used to transmit instructions to the hardware device. Accordingly, the hardware device translates instructions from the smartphone to a protocol that can be understood by the lighting fixtures.

The hardware interface device may be a compact battery powered unit which fits easily in a pocket or tool pouch or may be worn on a belt. It may use Bluetooth LE technology for communication with a smartphone application. Without requiring the user to be physically connected to the lighting fixture being controlled, the user can move about the workspace as needed with his/her smartphone and run the various apps and use it for on-the-job communication, such as troubleshooting. The device's 5 pin XLR female connector/ cable assembly allows it to be connected to a point in a DMX data chain (wired or wireless) to allow testing and or control of the various DMX/RDM channel functions. It is charged using a standard USB to Micro-USB cable and charger.

Accordingly, the hardware interface device is a small device that lighting users can carry to allow them, via a Bluetooth connection to an app on their smart phone, to test, control, or analyze a lighting fixture. The device may automatically detect a lighting fixture's "personality" and configures itself for proper control of complex lighting fixtures. In some embodiments, the device may be provided with, or connect to, a database of lighting fixtures so that a user can look up a particular fixture to be controlled, or so that the device can configure itself appropriately.

Typically, the device includes a fixture communication interface for transmitting data to a fixture using a first communication protocol, such as DMX, and an application communication interface for wirelessly receiving information using a second communication protocol, such as Bluetooth. The device further comprises a processor for converting the information received at the application communication interface from the second communication protocol to the first communication protocol.

The first communication protocol, in this case DMX, requires more data than can be transmitted using the Bluetooth protocol, and converting the information may include adding default data or restored data to data being transmitted to the fixture.

The device interfaces with a computer application, typically a smartphone application, or "app." The application associated with the device may then identify the lighting fixture to be tested and present the user with a user interface of the fixture's control parameters in graphical form, making it easy to select and control each element of the fixtures personality, such as intensity, colors, patterns, zoom, etc. In many cases, such as for fixtures that utilize RDM, the device lookup and identification of the fixture's personality takes place automatically and it may not be necessary to look it up in the database list manually.

The app also contains several other lighting related tools that provide added functionality such as a dip switch calculator, a light meter, a Wi-Fi spectrum analyzer, a DMX analyzer, an RDM controller, as well as a DMX controller in both simple slider form and a form which emulates the keypad on a typical professional lighting desk.

Since the tool can be plugged into a lighting fixture and then the user can walk away and control it, an audible tone can be generated from the app to help the user find the tool if the user forgets where it is plugged in. Also, since much lighting work is conducted in dark areas, a flashlight is built into the tool to enable the user to see where it is being plugged into. Other features include a removable belt clip.

Optional accessories include: 5Pin XLR to RJ45 adapter, 5Pin XLR male to 3Pin XLR female adapter, 5Pin XLR male to 5PinXLR male Gender Changer, Belt pouch.

Also described are methods for utilizing the device and system described to control a fixture, such as a lighting fixture.

DETAILED DESCRIPTION OF THE PREFERRED EMBODIMENTS

The description of illustrative embodiments according to principles of several illustrative embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits are illustrated by reference to certain exemplified embodiments and may not apply to all embodiments. Accordingly, the invention expressly should not be limited to such exemplary embodiments illustrating some possible non-limiting combination of features that may exist alone or in other combinations of features; the scope of the claimed invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Intelligent lighting installations with fixtures that have multiple parameters that must be controlled typically have maps of how channels of control affect various parameters of specified lighting fixtures. Accordingly, a brand and model specific mapping may be required to identify which control channel, such as a DMX slot, control particular functions. For example, slot 1 in a particular fixture may control color and slot 2 may control panning.

Further, many lighting devices provide multiple modes that may modify the default mapping. The mapping of particular control slots to particular parameters of a lighting fixture is known as a fixture "personality."

Figure 1A:
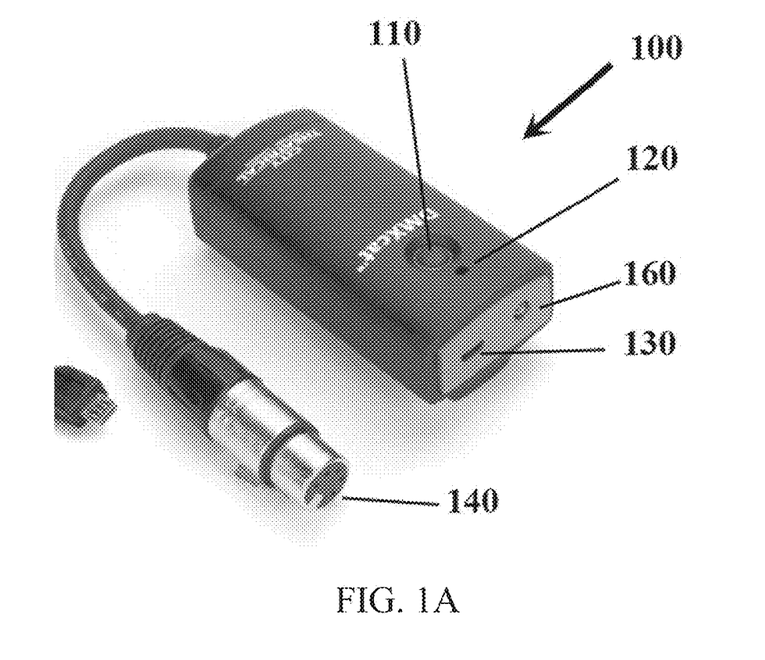
FIG. 1A shows a hardware device in accordance with this disclosure.
Figure 1B:
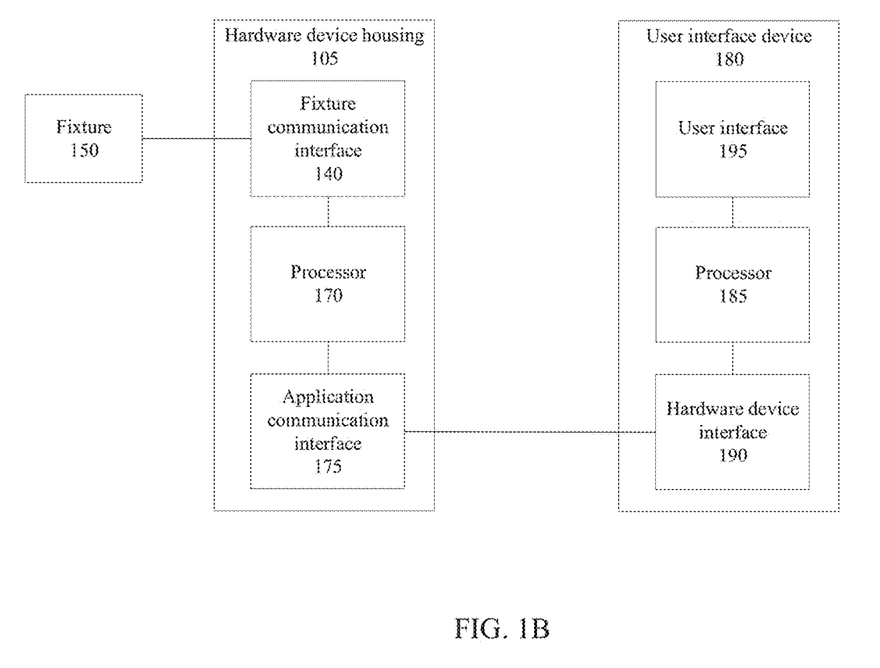
FIG. 1B shows a schematic diagram of the hardware device of FIG. 1A as part of a system for controlling and testing lighting systems.
Figure 2:
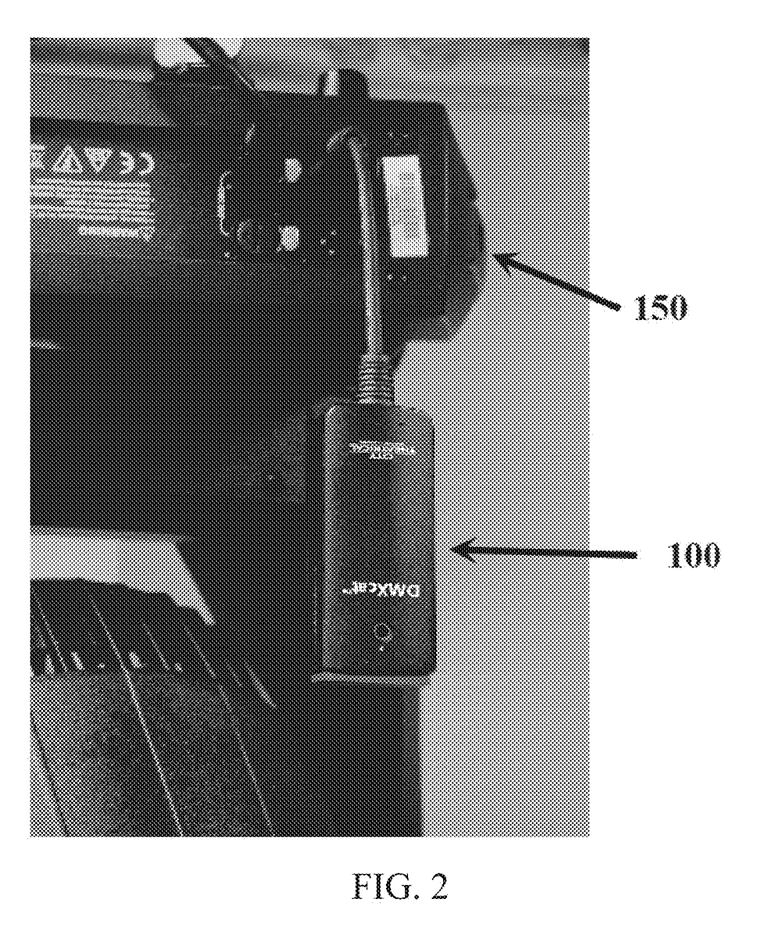
FIG. 2 shows the device of FIG. 1A connected to a lighting fixture.

FIG. 1A shows a hardware device 100 in accordance with this disclosure, FIG. 1B shows a schematic diagram of a system including the hardware device of FIG. 1A, and FIG. 2 shows the hardware device 100 connected to a lighting fixture 150. As shown, the device contains a housing 105 which supports a power button 110 for activating various features of the product, an LED 120 for indicating operating status, a micro USB port 130 for charging, or providing power, to the device, and a fixture communication interface 140, which may be, for example, a 5 pin XLR female connector, for connecting the device to the lighting fixture 150 to be controlled. While the device is shown and described with a 5 pin XLR female connection, other connectors may be used as well, such as 3 pin connections or RJ45 connections. In some embodiments, adaptors may be included with the device to modify the connection type so that a single device can be used with a wide variety of lighting fixtures. In some embodiments, the hardware device may include an LED flashlight 160. Such a feature may be useful, since lighting setups are often performed in darkened studios.

The hardware device 100 is further provided with an application communication interface 175 for communicating with a user interface device 180. This may be a wireless connection, such as Bluetooth. While implementations utilizing Bluetooth are discussed at length in the present application, it will be understood that other wireless interfaces, such as Wi-Fi or other radio technologies may be implemented as well. The hardware device 100 further incorporates a processor 170 for receiving and/or interpreting and processing instructions or other data received at one of the interfaces 140, 175, and for preparing data and/or instructions for transmission at the interfaces, as well as for managing other functions and indicators for the device 100.

The user interface device 180 is typically a portable electronic device, such as a smartphone, and typically includes a user interface 195 through which a user can interact with the hardware device 100, a hardware device interface 190 for communicating with the corresponding application communication interface 175 of the hardware device 100, and a processor for managing user instructions and data transmitted or received at the hardware device interface 190. Accordingly, the hardware device 100 is provided to control the lighting fixture 150, and a corresponding application, for use on a smart phone 180, is provided to control the hardware device remotely. The communication between the hardware device 100 and the user interface device 180 is performed by custom characteristics in the Bluetooth protocol. These custom characteristics, while part of the Bluetooth protocol standard, are designed to overcome limitations in throughput to the device. While the device 100 is described as using Bluetooth communications, it will be understood that other communication protocols may be used as well.

Bluetooth places restrictions on both payload size and message frequency rate. Traditional DMX/RDM communications would require more data than the Bluetooth protocol can manage. Therefore custom message characteristics are required to control the lighting from a smart phone that are be both size limited and rate limited such that they can be transmitted by the Bluetooth protocol. However, these custom messages cannot be easily understood by a lighting fixture, and therefore cannot be transmitted directly to the fixture.

Accordingly, in the user application at the user interface device 180, various control surfaces generated in the smartphone application may be used by the processor 185 to generate and send commands via the hardware device interface 190 using Bluetooth custom characteristics. These commands are then received at the hardware device 100 and are converted, at the processor 170 of the device, to messages formatted in accordance with a protocol the fixture can understand, such as DMX. Feedback messages are then provided to the hardware device from the lighting fixture, similarly converted to a custom message that can be transmitted by Bluetooth, and is sent back to the application. Such feedback responses may leverage standard protocols, including RDM, to maintain two way communications between the user interface device 180 and the fixture 150 This process is described in more detail below, with respect to FIG. 6.

In some embodiments, the user interface device 180 uses an internet connection to retrieve the appropriate attributes for a particular fixture 150 from a cloud source. In some embodiments, the application may perform this lookup automatically when a fixture is detected, while in others a user may manually look up particular lighting fixtures based on, for example, brand and models. In some embodiments, the application is preloaded with a database of common lighting fixtures such that an internet lookup is unnecessary.

Manually looking up and inputting an identification of a particular lighting fixture may be further complicated because so many fixtures are provided with multiple personalities. In some embodiments, a manual lookup process is avoided when connecting the hardware device 100 to a compatible lighting fixture 150. In such an embodiment, the hardware device 100 can query the fixture 150 and perform the required lookup automatically. With this information the application can display the proper control surfaces without the user manually selecting the attribute setting, thereby providing a user interface selected based on the particular fixture 150 being controlled. In querying the fixture, the hardware device 100 may be able to identify the current personality of the lighting fixture 150 in addition to the brand and model number.

Figure 3:
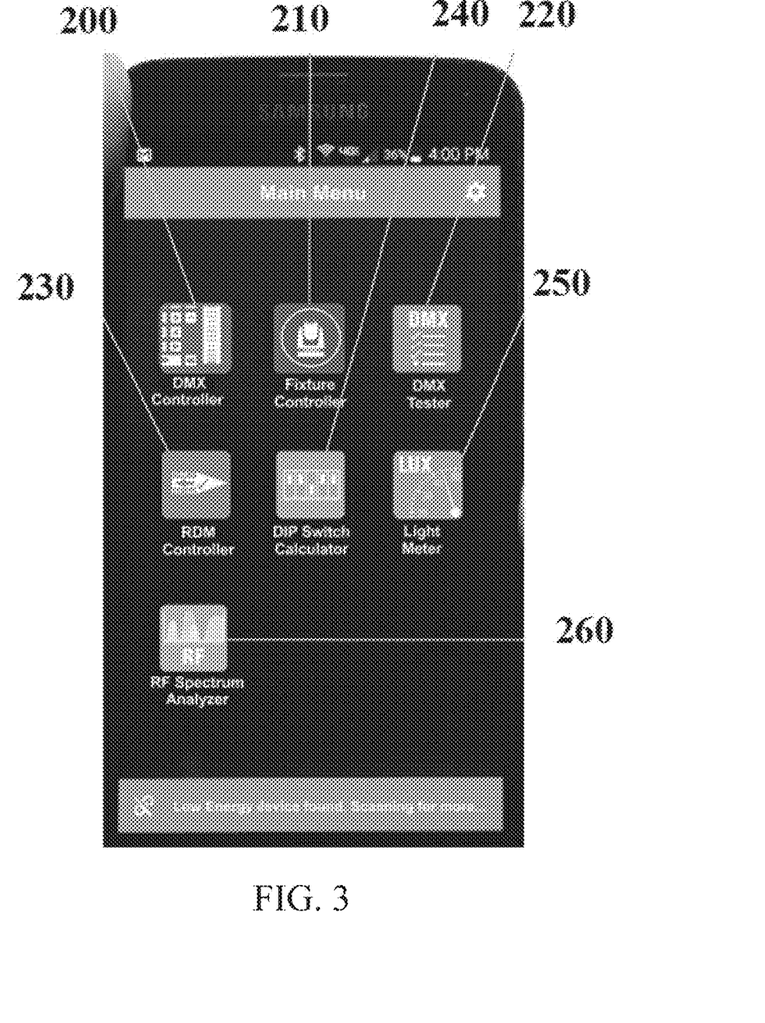
FIG. 3 shows a smartphone application for use with the hardware device of FIG. 1A in the system of FIG. 1B.
Figure 4:
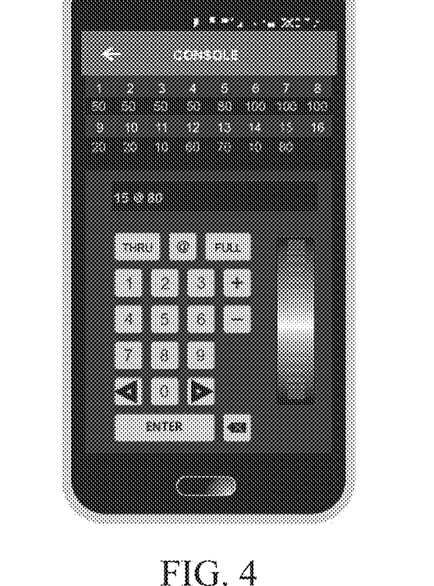
FIG. 4 shows a console interface accessible through the smartphone application of FIG. 3.
Figure 5:
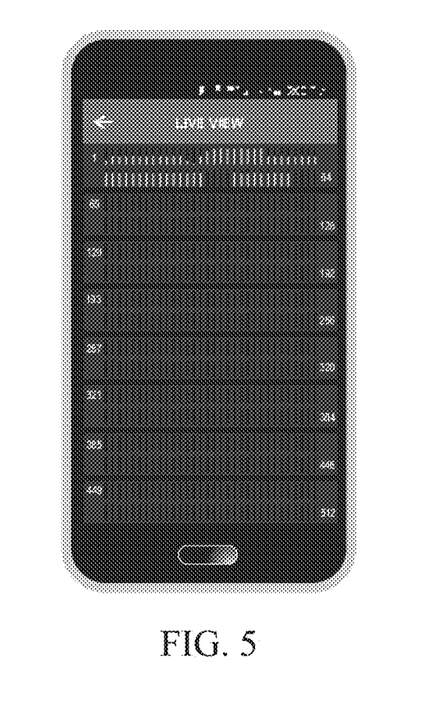
FIG. 5 shows a display of the current status of a lighting interface in the application of FIG. 3.

FIG. 3 shows a smartphone application for use on the user interface device 180 with the hardware device 100 of FIG. 1A, and FIGS. 4 and 5 show two interfaces available through the smartphone application.

The smartphone application includes a DMX controller application 200. The DMX Controller app is a flexible and feature rich means for controlling 512 slots of DMX data. Two different user interfaces are included. The first emulates a conventional slider control arrangement such as is found on many simple manual lighting controllers. Touch and swipe gestures control the various level adjustments. Users can work with and easily switch between screens displaying 8, 64, or 512 (Live View, as shown in FIG. 5) channels of information. For those who prefer a numeric based interface similar to what is found on a full sized lighting console, command line instructions can be input using familiar keypad and thumbwheel controls, as shown in FIG. 4. An active 16 channel display provides current channel status. With either interface, users can adjust/work with individual, groups or ranges of channels, record and play presets, customize names, and display levels as percentage, decimal or hex values.

The smartphone application further includes a fixture controller application 210. The fixture controller App has been designed to serve as a setup and test tool for the vast selection of complex lighting fixtures in use today. Many of today's moving light fixtures use over 40 channels of DMX control data, and can be configured to operate in a dozen or more modes (personalities). This can make it difficult to identify a particular channel's function when setting up or testing/troubleshooting a fixture. Using an extensive database of manufacturers, fixtures, and corresponding personalities, users can quickly identify, select, and assign the fixture profiles being used in order to isolate and test each function. Once the Personality has been assigned, controls are displayed for testing all features like pan, tilt, zoom, focus, colors etc. The various fixtures/personalities may be saved as "favorites" for future reference.

Figure 6:
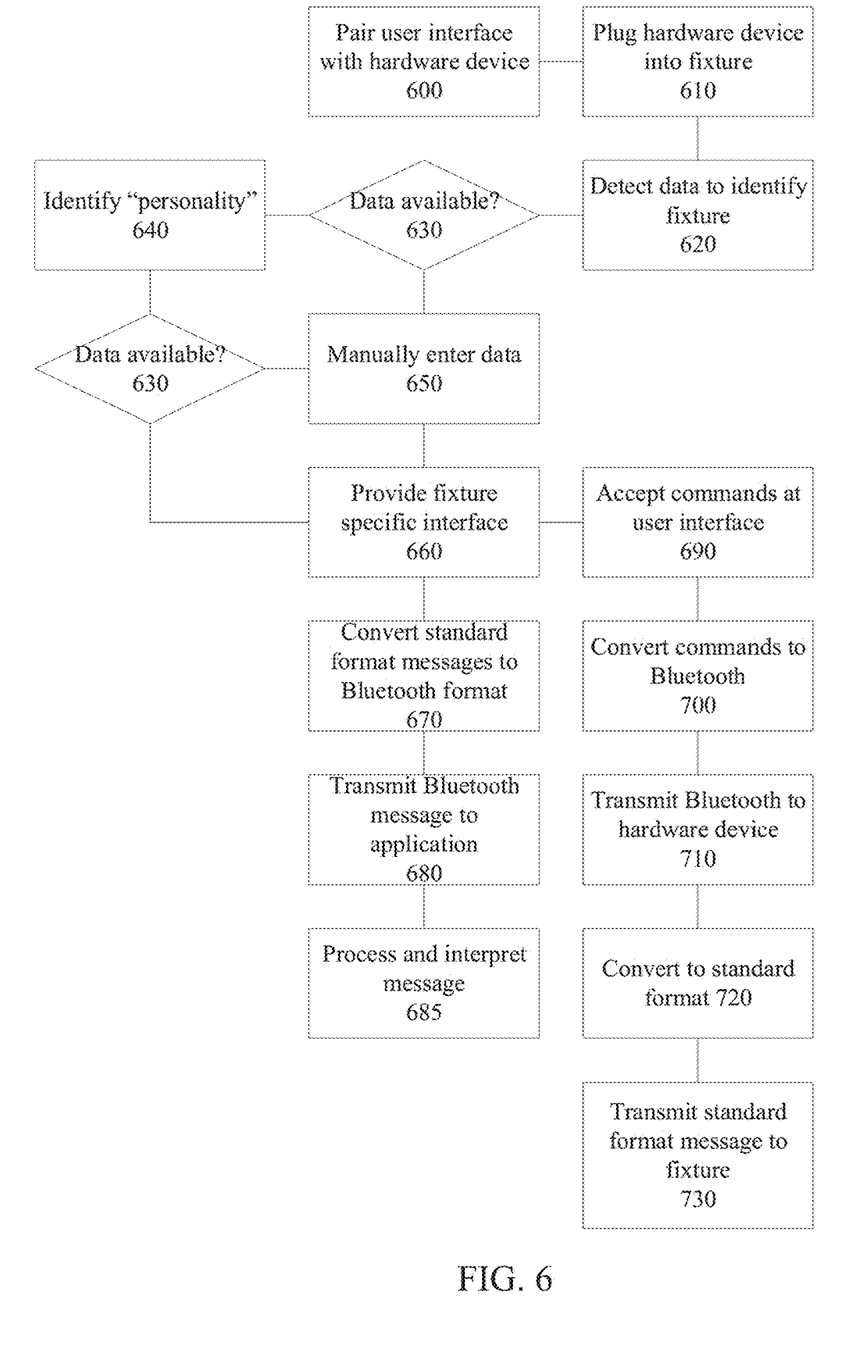
FIG. 6 shows a method for using the system of FIG. 1B to test lighting systems.

FIG. 6 shows a method for using the system of FIG. 1B to test and control lighting systems. It will be understood that while the device 100 and system are described with respect to lighting systems, the system may also be used to control additional fixture types other than lighting.

As shown, a user initially pairs a user interface, such as an application at the user interface device 180, with the hardware device 100 (600). Once paired, the hardware device 100 is connected to a fixture that the user would like to control, typically by plugging a cable in the device 100 into the fixture 150 (610).

Once connected, the device 100 attempts to detect data from the fixture 150 in order to identify the fixture 150 itself (at 620), as well as the "personality" to which the fixture is set (640). If data identifying the fixture 150 to be controlled cannot be retrieved by the device 100 (at 630), a user may manually enter the data (650) by either manually identifying settings or by selecting the fixture from a database.

Once the fixture 150 is properly identified, the user may be provided with a fixture specific interface (660), or a generic set of control surfaces at the user interface 195. This may be, for example, in the context of a smartphone application, as shown in FIG. 3-5.

Once connected in this way, two way communication between the device 100 and the user interface device 180 may be enabled. As one example, a message may be retrieved from the fixture 150 in a standard format at the fixture communication interface 140 of the device. This message may be in an RDM format. Once retrieved by the device, it may be converted or translated to a Bluetooth message at the processor 170 (670), and transmitted via Bluetooth at the application communication interface 175 (680). Upon receipt of these messages, they may be processed at the processor 185 of the user interface device 180 and interpreted (685). Such messages may provide data for display at the user interface 195, such as the current state of the fixture 150 or data detected at any sensors of the fixture.

Similarly, or subsequent to receiving messages from the fixture 150, the user interface device 180 may accept commands at the user interface 195 for modifying or adjusting some aspect of the fixture (690). Accordingly, upon receipt of a command from a user, the device may convert the command to Bluetooth, using the processor 190 (700), and transmit it via Bluetooth using the hardware device interface 185 (710). Upon receipt of the Bluetooth message via the application communication interface 175, the message is converted, at the processor 170, to a message format that can be interpreted by the fixture 150, such as DMX (720), and then transmitted to the fixture 150 at the fixture communication interface 140 (730).

Typically, the message format and communication protocol used to transmit data, such as instructions, to the fixture 150 contains more data, or requires a higher rate of transmission, than can be transmitted using the communication protocol used to communication between the device 100 and the user interface device 180. For example, DMX requires more data, or larger or faster communications, than can typically be managed via Bluetooth. Accordingly, as part of the conversion process, when DMX messages are converted to Bluetooth, certain data may be stripped or replaced with compressed data. Upon converting the data back to DMX, default data may be added, or compressed data may be restored.

In some embodiments, the smartphone application discussed above with respect to FIGS. 3-5 may contain additional features. For example, the smartphone application may further include a DMX tester application 220. With this app, the user can adjust parameters of the controllers' transmitted DMX signals and view the parameters of received DMX signals including: Break time, Mark after Break, Inter-slot, Mark Before Break, Number of Slots, and Refresh Rates, as well as levels.

The smartphone application further includes an RDM controller application 230. The RDM controller is an application designed to control RDM enabled fixtures. Features include:

Control & monitoring of RDM devices
Full discovery—detects and generates a list of all RDM devices.
Detects all sub devices for a selected device
Shows all supported parameters
Shows descriptions for all parameter identifications (PID).
GET and SET for all PIDs (even user defined)
Monitors fixtures for any sensors with easy to view info RDM functionality automatically detects and assigns fixture profiles, making the Fixture and Personality Test applications even easier to use.

The smartphone application further includes a DIP switch calculator application 240. The DIP switch calculator app is a tool used in the conversion of numeric values to their binary equivalents. Used when configuring DIP switches for setting DMX slot addresses the fixture will respond to and other fixture parameters, users simply enter a three digit numeric value and its corresponding DIP setting is displayed. Both the numbering order and reading direction can be reversed to match the switch orientation as needed.

The smartphone application further includes a light meter application 250. Useful for studio work, this app offers reflected light measurements to help in light level adjustment for film and video production. Light levels may be displayed in LUX.

The smartphone application further includes an RF spectrum analyzer application 260. This application assists a user in identifying potential communication problems before they happen. The RF Spectrum analyzer enables the user to visualize existing Wi-Fi networks operating within a venue. Each wireless network is labeled and shown graphically within an overall schematic representation of the 2.4 GHz RF channel spectrum. Armed with this information, wireless DMX operation can be optimized by adjusting the type of transmission (hopping patterns) and or locating the control network in uncrowded or unused areas of the RF Spectrum.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A device for controlling a fixture comprising:
    a fixture communication interface for transmitting data to a fixture using a first communication protocol;
    an application communication interface for wirelessly receiving information using a second communication protocol;
    a processor for converting the information received at the application communication interface from the second communication protocol to the first communication protocol,
    wherein the first communication protocol requires more data than can be transmitted using the second communication protocol, and
    wherein converting the information includes adding default data or restored data to data being transmitted to the fixture.

2. The device of claim 1, wherein the first communication protocol is DMX and the second communication protocol is Bluetooth.

3. The device of claim 1, wherein the fixture communication interface retrieves identification data from the fixture, and wherein the identification data identifies both the fixture and a personality of the fixture.

4. The device of claim 3, wherein the application communication interface further comprises a transmission module for transmitting data to a user interface device using the second communication protocol, and wherein the transmission module transmits the identification data to the user interface device.

5. The device of claim 1, wherein the fixture is a light fixture.

6. A system for controlling a fixture comprising:
a user interface device containing a user interface for receiving user commands and a hardware device interface for wirelessly transmitting the user commands in a first format, and
a hardware device comprising an application communication interface for wirelessly receiving the user commands in the first format and a fixture communication interface for transmitting the user commands to a fixture in a second format, and a converter for converting the user commands from the first format to the second format,
wherein the user command encoded in the first format requires less data than the user command encoded in the second format, and
wherein converting the user command includes adding default data or restored data to data being transmitted to the fixture.

7. The system of claim 6 wherein the first format is Bluetooth and the second format is DMX.

8. The system of claim 6 wherein user interface receives the user command in a third format and the user interface device converts the command to the first format prior to transmitting the user commands to the hardware device.

9. The system of claim 6, wherein the fixture communication interface further retrieves a fixture message in the second format, the converter converts the fixture message to the first format, and the application communication interface transmits the fixture message to the user interface device, and wherein data contained in or derived from the fixture message is presented at the user interface.

10. The system of claim 9, wherein the fixture message is responsive to a user command.

11. The system of claim 9, wherein the fixture message comprises fixture identification data, and wherein the fixture is identified by the user interface device based on the fixture identification data.

12. The system of claim 6, wherein the fixture is a light fixture.

13. A method for controlling a fixture, the method comprising:
mating a hardware device with the fixture to be controlled, the hardware device comprising a fixture communication interface for communicating with the fixture and an application communication interface for communicating wirelessly with a user interface device;
providing the user interface device in wireless communication with the application communication interface of the hardware device;
accepting a user command at a user interface of the user interface device;
converting the user command for transmission using a wireless protocol;
transmitting the user command to the hardware device using the wireless protocol;
converting the user command to a specified format at the hardware device; and
transmitting the user command in the specified format to the fixture,
wherein converting to the specified format comprises adding content to the user command.

14. The method of claim 13 wherein the wireless protocol is Bluetooth and the specified format is DMX.

15. The method of claim 13, wherein the specified format cannot be transmitted wirelessly, and where the fixture cannot interpret messages formatted for the wireless protocol.

16. The method of claim 13, wherein the fixture is a lighting fixture.

17. The method of claim 13 further comprising:
receiving, at the hardware device, a fixture message from the fixture in the specified format;
converting the fixture message for transmission using the wireless protocol;
transmitting the fixture message to the user interface device; and
displaying content based on the fixture message at the user interface.

18. The method of claim 17, wherein the fixture message contains fixture identification information, and wherein the content is a layout for the user interface specific to the fixture.

19. The method of claim 17, wherein the fixture message uses an RDM protocol.

20. A method for controlling a fixture, the method comprising:
mating a hardware device with a fixture to be controlled, the hardware device comprising a fixture communication interface for communicating with the fixture and an application communication interface for communicating wirelessly with a user interface device;
providing a user interface device in wireless communication with the application communication interface of the hardware device;
accepting a user command at a user interface of the user interface device;
converting the user command for transmission using a wireless protocol;
transmitting the user command to the hardware device using the wireless protocol;
converting the user command to a specified format at the hardware device;
transmitting the user command in the specified format to the fixture;
receiving, at the hardware device, a fixture message from the fixture in the specified format;
converting the fixture message for transmission using the wireless protocol;
transmitting the fixture message to the user interface device; and
displaying content based on the fixture message at the user interface.

* * * * *